(12) United States Patent
Lu et al.

(10) Patent No.: US 11,329,833 B2
(45) Date of Patent: May 10, 2022

(54) PROGRAMMABLE DEVICE KEY PROVISIONING

(71) Applicant: Intel Corporation, Santa Clara, CA (US)

(72) Inventors: Ting Lu, Austin, TX (US); Robert Landon Pelt, Austin, TX (US); James Ryan Kenny, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 911 days.

(21) Appl. No.: 15/719,039

(22) Filed: Sep. 28, 2017

(65) Prior Publication Data
US 2019/0097818 A1 Mar. 28, 2019

(51) Int. Cl.
| | |
|---|---|
| *H04L 29/06* | (2006.01) |
| *H04L 9/32* | (2006.01) |
| *H04L 9/14* | (2006.01) |
| *H04L 9/30* | (2006.01) |
| *H04L 9/08* | (2006.01) |

(52) U.S. Cl.
CPC .......... *H04L 9/3278* (2013.01); *H04L 9/0861* (2013.01); *H04L 9/0866* (2013.01); *H04L 9/0894* (2013.01); *H04L 9/0897* (2013.01); *H04L 9/14* (2013.01); *H04L 9/30* (2013.01); *H04L 9/3247* (2013.01); *H04L 9/3263* (2013.01); *H04L 2209/12* (2013.01); *H04L 2209/34* (2013.01); *H04L 2209/84* (2013.01)

(58) Field of Classification Search
CPC ........ H04W 12/00; H04L 9/00; H04L 9/3278; H04L 9/14; H04L 9/0861; H04L 9/0894; H04L 9/3247; H04L 2209/12; G06F 21/00
See application file for complete search history.

(56) References Cited

U.S. PATENT DOCUMENTS

| | | | | |
|---|---|---|---|---|
| 2014/0108786 | A1* | 4/2014 | Kreft | G06Q 20/3825 713/156 |
| 2015/0012737 | A1* | 1/2015 | Newell | G06F 21/575 713/2 |

\* cited by examiner

*Primary Examiner* — Baotran N To
*Assistant Examiner* — Leynna Truvan
(74) *Attorney, Agent, or Firm* — Fletcher Yoder PC (57) ABSTRACT

The present disclosure provides systems and methods for improving provision of secret data on programmable devices. An appliance receives physical unclonable function (PUF) data pertaining to an integrated circuit. Secret data is provided to the appliance from a secret vault. Public and private PUF keys are derived based upon the PUF data. Further, ephemeral public and private keys are derived by the appliance. The public and private PUF keys, along with the ephemeral public and private keys are used to establish a secure channel for programming the secret data on the programmable device.

19 Claims, 11 Drawing Sheets

PROGRAMMABLE DEVICE KEY PROVISIONING

BACKGROUND

The present disclosure generally relates to integrated circuit devices and, more particularly, to provisioning security keys for an integrated circuit device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic device or an electrical system may include one or more integrated circuit (IC) devices. To improve operational flexibility, in some instances, an integrated circuit device may be a programmable logic device that is programmable (e.g., configurable) after manufacturing to provide one or more target (e.g., desired) functions, such as a field programmable gate array (FPGA). To facilitate providing a target function, an integrated circuit device may include one or more logic elements (e.g., blocks and/or gates), for example, programmed (e.g., configured) to operate based at least in part on corresponding configuration data.

The programmable devices may be manufactured by a manufacturer. Typically, this process may take place in geographical regions with reduced manufacturing costs, in order to reduce the overall manufacturing costs of the device. Oftentimes, the manufacturers reside is separate geographical regions than the product owners who have commissioned the programmable device manufacturing. As mentioned above, the programmable devices may be programmed with software that enables specific functions on the programmable devices. For example, a Network Routing Device product owner may develop software that programs the programmable device, manufactured by the manufacturer, to perform network routing features.

The software may be quite valuable, as the software may provide new and/or enhanced functionality for the programmable devices. Further, in some instances, it may be desirable to maintain secrecy of the functionality, especially for sensitive functions, such as military functionality and/or secure transactions. Accordingly, the product owners may wish to secure the programmable device silicon.

Traditionally, programmable devices are sold as open silicon, meaning there is no secret establishment for the silicon. To establish the secret, for use in the security enablement of the silicon, a secret key is injected onto the silicon. As may be appreciated, the secret key is oftentimes considered the most important security asset for the security establishment of the silicon. As may be appreciated, in high volume production, a significant number of keys (e.g., millions of keys) may be needed to program into the unsecured (e.g., open) programmable devices. Any incidence of security key leakage, no matter how small, may result in a security compromise for an entire product line and/or multiple product lines that share a similar key. Accordingly, complex secret key injection techniques have been utilized to ensure that the secret security keys are not leaked during any intermediate steps of the programming of the programmable device.

In some systems, Plain Text Key Provisioning may be used. Plain Text Key Provisioning relies on programming unprotected keys (e.g., "red" keys) onto a programmable device without any protection. This process relies on a secure key provisioning facility and fully trusted operators to program the unprotected key materials onto the programmable device. As may be appreciated, this not only result in significant cost to customers and but also makes it very difficult to detect and/or remediate operator tampering with the secret key material, resulting in security risks.

In some systems, Silicon Key Encryption Provisioning may be used. Silicon Key Encryption Provisioning relies on silicon manufacturer to embed an encrypted secret key (e.g. "black" keys) into device before silicon is shipped to users. In some situations, using such a provisioning technique relies on the silicon manufacturer using its own super keys for user's secret. Leakage of this super key will result in leaking secret keys for the programmable devices. Further, a confidential secret channel may be necessary to pass the secret keys from silicon manufacturer to end users. Finally, this technique increases a cost for the silicon manufacturers, due to the secret key injection process in the manufacturing flow, along with maintenance of a secret key database.

Regardless of the provisioning approach that is used, certain inefficiencies may be experienced. During the initial key provisioning, the product owner (e.g., the Network Routing Device product owner, discussed above) may ship the open programmable devices from the manufacturer back to the home country of the product owner. As mentioned above, the geographical regions between the manufacturer and the product owner are oftentimes far from one another, causing significant shipping overhead, both in terms of time and money. Once received at the home country, the product owner may contract with a trusted secure key programming house that injects the security key into the open programming devices. Once the security keys are injected, the programmable devices may then be shipped back to a manufacturer (e.g., a contract manufacturing facility) for programming and placed into product inventory.

As may be appreciated, this security key injection process may result in significant cost and time inefficiencies. For one, there is an added shipping time and expense for shipping the programmable devices between the manufacturer and the trusted secure key programming house. Further, because of the increased processing time created by this shipping, a longer inventory pipeline may be needed, resulting in increased inventory size. Further, limited debugging capabilities may be feasible at the contract manufacturing facility, as the secured silicon may not have debugging capabilities. Additionally, these traditional techniques do not protect against over-builds, where the manufacturer creates product knock-offs by making unauthorized copies of the open silicon. The techniques described below enhance the key provision process for programmable devices, resulting in reduced time and cost.

SUMMARY

A summary of certain embodiments disclosed herein is set forth below. It should be understood that these aspects are presented merely to provide the reader with a brief summary of these certain embodiments and that these aspects are not intended to limit the scope of the present disclosure. Indeed, the present disclosure may encompass a variety of aspects that may not be set forth below.

The present disclosure generally relates to integrated circuit (IC) devices, which may operate to perform one or more target (e.g., desired) functions in an electrical system. The IC's may be protected by injecting product owner-maintained security keys onto the IC. To facilitate injection of such keys, in some embodiments, a physical unclonable function (PUF) of the IC may be used as an enrollment mechanism for the programmable device.

A Physically Unclonable Function (PUF) is a physical circuit inside an integrated circuit device whose behavior is determined by random physical variations inside the integrated circuit or within the proximate environment of the integrated circuit. PUFs may be used to derive encryption keys for configuring programmable devices, such as Field Programmable Gate Arrays (FPGAs), which are integrated circuits that include programmable logic blocks and programmable routing. The random physical variations in and around the integrated circuits may be due to random manufacturing variations within the device (such as variations in transistor thresholds, transistor driver strengths, capacitances, or resistances), or may be due to explicitly added sources of variations (such as device coatings that contain a slurry of dielectric particles that cause random fluctuations in capacitance sensors).

The PUF-based enrollment may be used to facilitate provision of black keys onto the IC (which may be in the custody of the manufacturer), while limiting access to the black keys by the IC manufacturer. Accordingly, the present disclosure provides techniques that improve security and manufacturing efficiencies, by reducing a time to market for ICs, along with increasing security around the production of the ICs.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Generally, an integrated circuit device operates to provide one or more target functions in an electrical system. For example, the target functions may include combinational functions, sequential functions, arithmetic functions, logic functions, and/or custom function. Thus, in some embodiments, an integrated circuit device may operate to process data, analyze data, store data, and/or read data.

Figure 1:
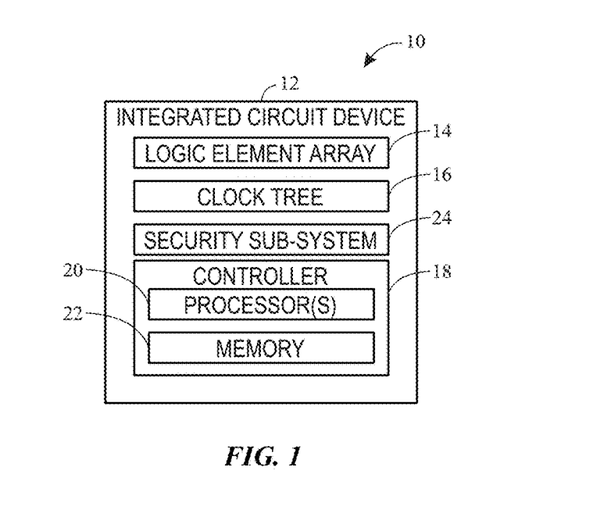
FIG. 1 is a block diagram of an electrical system including an integrated circuit device, in accordance with an embodiment.

To help illustrate, one embodiment of an electrical system 10 including an integrated circuit device 12 is shown in FIG. 1. In some embodiments, the electrical system 10 may be included in an industrial system, a manufacturing system, an automation system, or the like, such as a factory or plant. Additionally, in some embodiments, the electrical system 10 may be included in an electronic device, such as a handheld computing device, a tablet computing device, a notebook computer, a desktop computer, or the like. Furthermore, in some embodiments, electrical system 10 may be included in an automotive system, such as an airplane, boat, or car.

Thus, although one integrated circuit device 12 is depicted, it should be appreciated that this is merely intended to be illustrative and not limiting. In other words, in other embodiments, the electrical system 10 may include multiple integrated circuit devices 12. For example, the electrical system 10 may include a first integrated circuit 12 (e.g., central processing unit or graphics processing unit) communicatively coupled with a second integrated circuit 12 (e.g., random-access memory).

In any case, as depicted, the integrated circuit device 12 includes a logic element array 14, a clock tree 16, and a controller 18. In some embodiments, the controller 18 may control operation of the logic element array 14 and/or the clock tree 16. To facilitate controlling operation, the controller 18 may include a controller processor 20 and controller memory 22. In some embodiments, the controller 18 may control operation based at least in part on circuit connections (e.g., logic gates) formed in the controller 18.

Additionally or alternatively, the controller processor 20 may execute instructions stored in the controller memory 22. Thus, in some embodiments, the controller processor 20 may include one or more general purpose microprocessors, one or more application specific processors (ASICs), one or more field programmable logic arrays (FPGAs), and/or the like. Additionally, in some embodiments, the controller memory 22 may include one or more tangible, non-transitory, computer-readable mediums. For example, the controller memory 22 may include random access memory (RAM), read only memory (ROM), rewritable non-volatile memory, such as flash memory, hard drives, optical discs, and/or the like.

The integrated circuit device 12 may operate to perform one or more target functions in the electrical system 10. To facilitate providing a target function, the logic element array 14 may include communicatively coupled logic elements (e.g., blocks or gates) that operate to perform combinational functions, sequential functions, arithmetic functions, logic functions, and/or custom functions. Additionally, in some embodiments, the logic element array 14 may be divided into one or more logic regions, which each includes one or more logic elements.

The integrated circuit device 12 may also include a security sub-system 24 that is used to secure the integrated circuit device 12. For example, as will be discussed in more detail below, the security sub-system 24 may enable secret key information to be provided from a product owner's key vault to the integrated circuit device 12, without releasing a secret to the manufacturer of the integrated circuit device 12.

Figure 2:
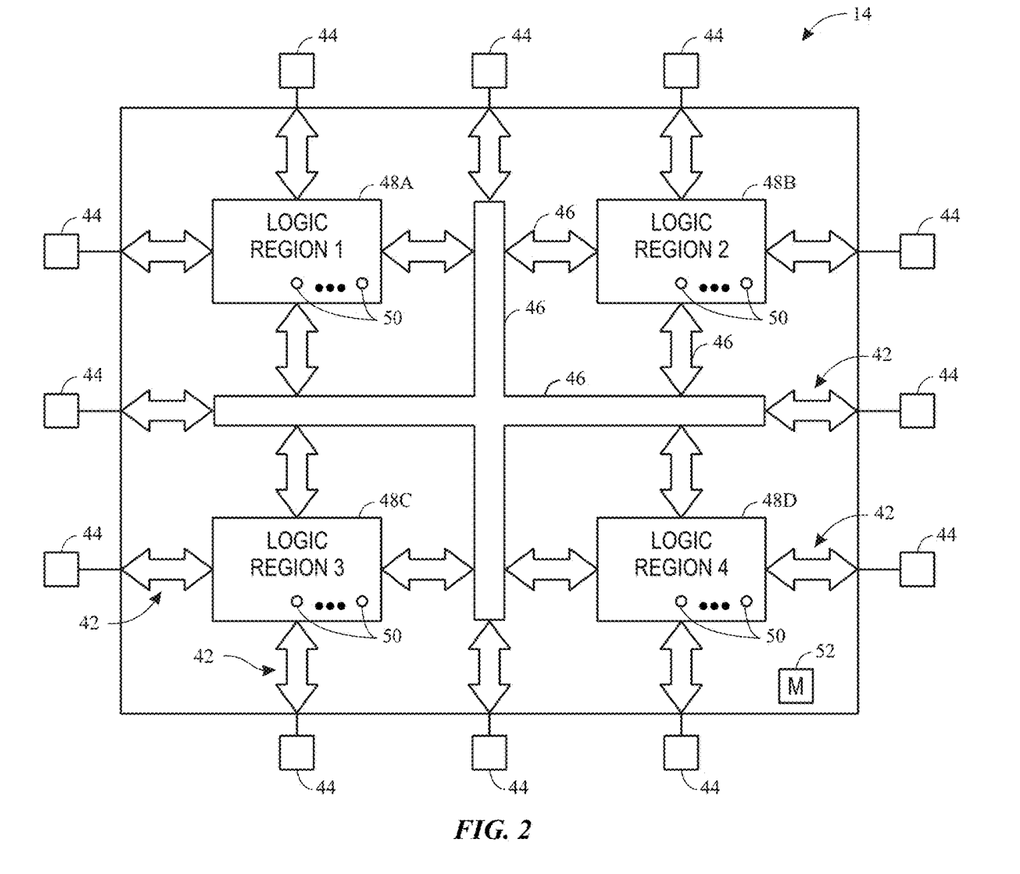
FIG. 2 is a block diagram of a logic element array included in the integrated circuit device of FIG. 1, in accordance with an embodiment.

One embodiment of a logic element array 14 organized into multiple logic regions 48 is shown in FIG. 2. In particular, the depicted embodiment includes a first logic region 48A, a second logic region 48B, a third logic region 48C, and a fourth logic region 48D, which each includes one or more logic elements 50. In some embodiments, a logic element 50 may include one or more muxes, one or more flip-flops, one or more logic gates, one or more logic blocks, one or more look-up-tables, and/or one or more registers.

In some embodiments, the logic element array 14 may be organized such that different logic regions 48 operate to perform different target functions. Additionally or alternatively, the logic element array 14 may be organized such that multiple logic regions 48 cooperate to perform a target function. Thus, to facilitate proper operation of the integrated circuit device 12, operation of different logic regions 48 may be coordinated (e.g., synchronized) and/or data communication may be provided.

To facilitate data communication, the logic element array 14 may include input/output circuitry 42, input/output pins 44, and an internal communication network 46 (e.g., a network-on-chip). In some embodiments, the input/output circuitry 42 may facilitate external data communication via the input/output pins 44, for example, between the logic element array 14 and another integrated circuit device 12. Additionally, in some embodiments, internal communication network 46 may facilitate internal data communication, for example, between logic regions 48 and/or with input/output circuitry 42. Thus, in some embodiments, the internal communication network 46 may include interconnects, such as conductive lines and/or busses. Furthermore, in some embodiments, the internal communication network 46 may include fixed interconnects and/or programmable interconnects.

Figure 3:
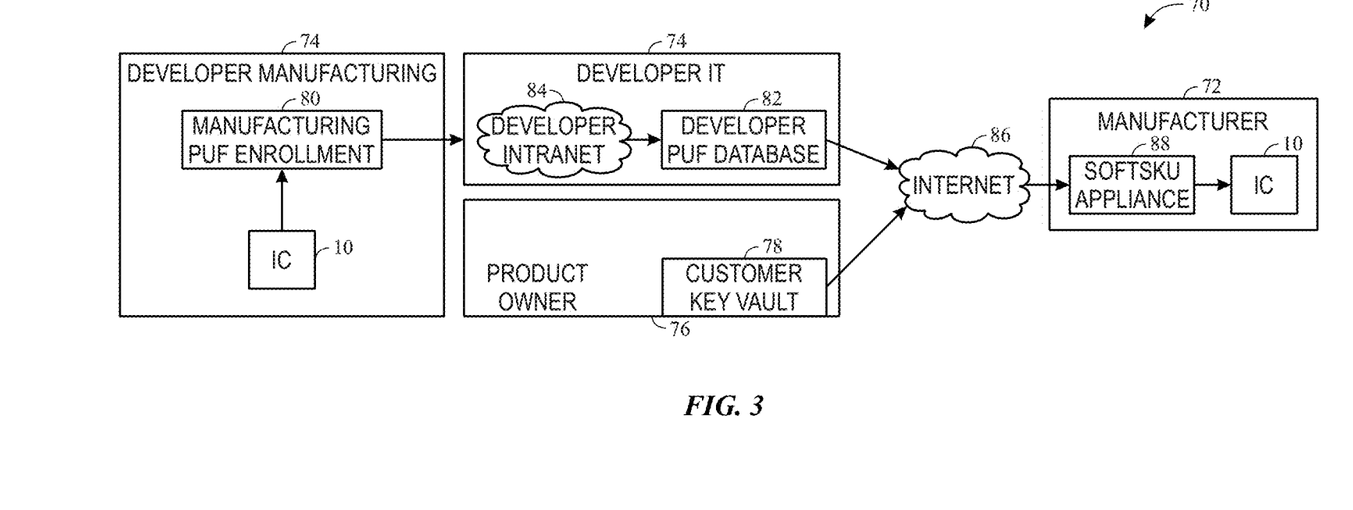
FIG. 3 is a block diagram of a system for injecting a secret key onto a programmable device without exposing the secret key to a manufacturer of the programmable device, in accordance with an embodiment.
Figure 4:
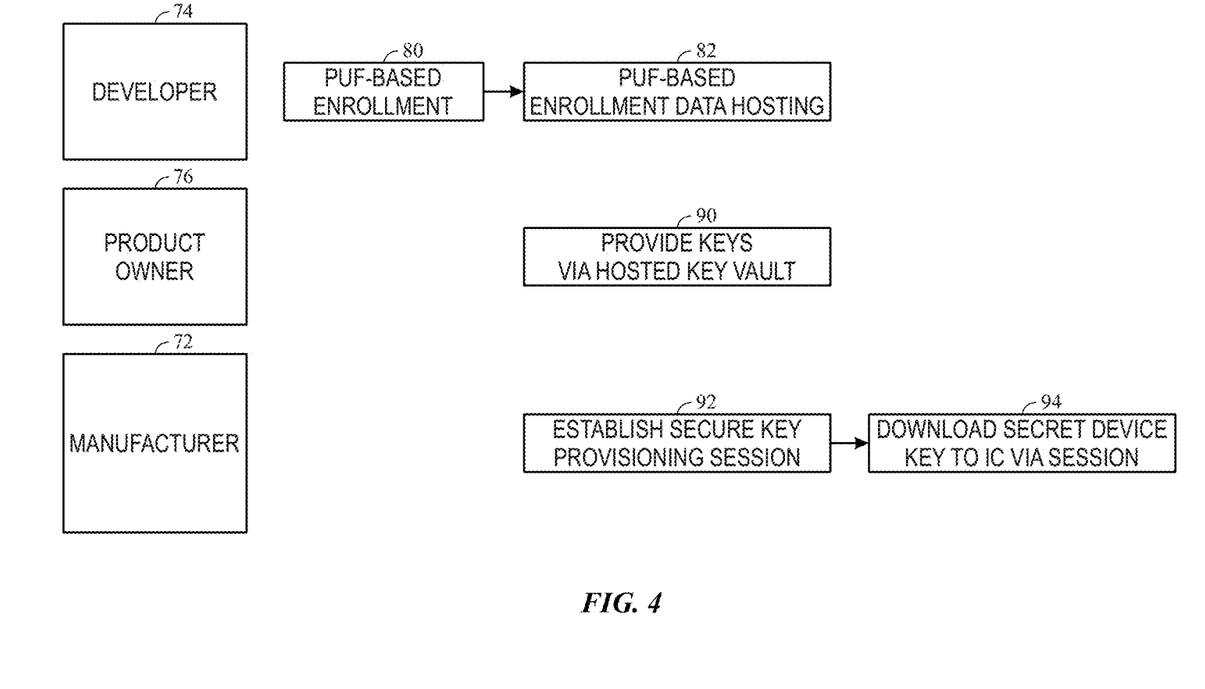
FIG. 4 is swim lane diagram, illustrating processes for various actors for injecting the secret key onto the programmable device without exposing the secret key to a manufacturer of the programmable device, in accordance with an embodiment.

Turning now to a discussion of provisioning black keys on the programmable device (e.g., IC 10), FIG. 3 is a block diagram of a system 70 for injecting a secret key onto a programmable device (e.g., IC 10) without exposing the secret key to a manufacturer 72 of the programmable device, in accordance with an embodiment. FIG. 4 is swim lane diagram, illustrating processes implemented by various actors for injecting the secret key onto the programmable device without exposing the secret key to a manufacturer of the programmable device, in accordance with an embodiment. For clarity, FIGS. 3 and 4 will be discussed together.

In the embodiment illustrated in FIG. 3, the system 70 includes three primary entities, the manufacturer 72, the developer 74, and the product owner 76. In alternative embodiments, less or more entities may exist. For example, in some embodiments, the developer 74 and manufacturer 72 may be a common entity, the product owner 76 and the developer 74 may be a common entity, the developer 74 and the manufacturer 72 may be a common entity, etc.

The developer 74 may be the designer of the programmable device (e.g., IC 10). The developer 74 may contract with the manufacturer 72, for manufacturing of the programmable device (e.g., IC 10). The product owner 76 may contract with the developer 74 for purchase of the programmable device (e.g., IC 10). The product owner 76 may program the programmable device (e.g. IC 10) with functions that the product owner 76 wishes to have secured.

The product owner 76 may wish to retain the secret key information, rather than provide this information to the manufacturer 72 and/or the developer 74. For example, the product owner 76 may implement highly secured data processing on the IC 10, such as for a government implementation. The product owner 76, in this case, the government, may wish to retain the secret keys, instead of providing the secret keys for implementation by the manufacturer 72 and/or the developer 74. Accordingly, the product owner 76 may maintain a customer key vault 78, which may store keys (e.g., black keys) for each of the authorized IC's 10.

To attest that the proper keys are provisioned to the IC's 10, a baseline secret may be used to correlate the keys with corresponding IC's 10. For example, during the manufacturing process, a PUF enrollment process 80 may result in one or more keys (e.g., red keys) that are derived from PUF information of a corresponding IC 10. Additionally, help data and/or other options (e.g., eFuse options) may be generated, which may be used by the IC's 10 to regenerate the same PUF-based keys during a subsequent activation operation. The one or more keys, along with the help data and/or the other options, may be provided via a PUF database hosting service 82 (e.g., via developer intranet 84).

The PUF database hosting service 82 may be accessible by the manufacturer 72 via the Internet 86. For example, the manufacturer 72 may host the SoftSKU appliance 88, which serves as the mechanism for transferring black keys to the ICs 10.

Because the Internet 86 can sometimes be unreliable when transferring significant amounts of data across vast distances (e.g., from the developer's location to the manufacturer's location) batch provision of PUF data may be transmitted between the PUF database hosting service 82 and the SoftSKU appliance 88. Further, the PUF database hosting service 82 may periodically provide data updates to the SoftSKU appliance 88. Additionally, the SoftSKU appliance 88 may receive (e.g., via the Internet 86) keys provided by the product owner 76, via the the customer key vault 78 (block 90) and store the keys (e.g., black keys) supplied from the customer key vault 78 for implementation on the IC's 10. After establishing a secure key provisioning session (block 92), the SoftSKU appliance 88 may then securely provision the keys from the customer key vault 78 (e.g., black keys) on the ICs 10 (block 94).

Figure 5:
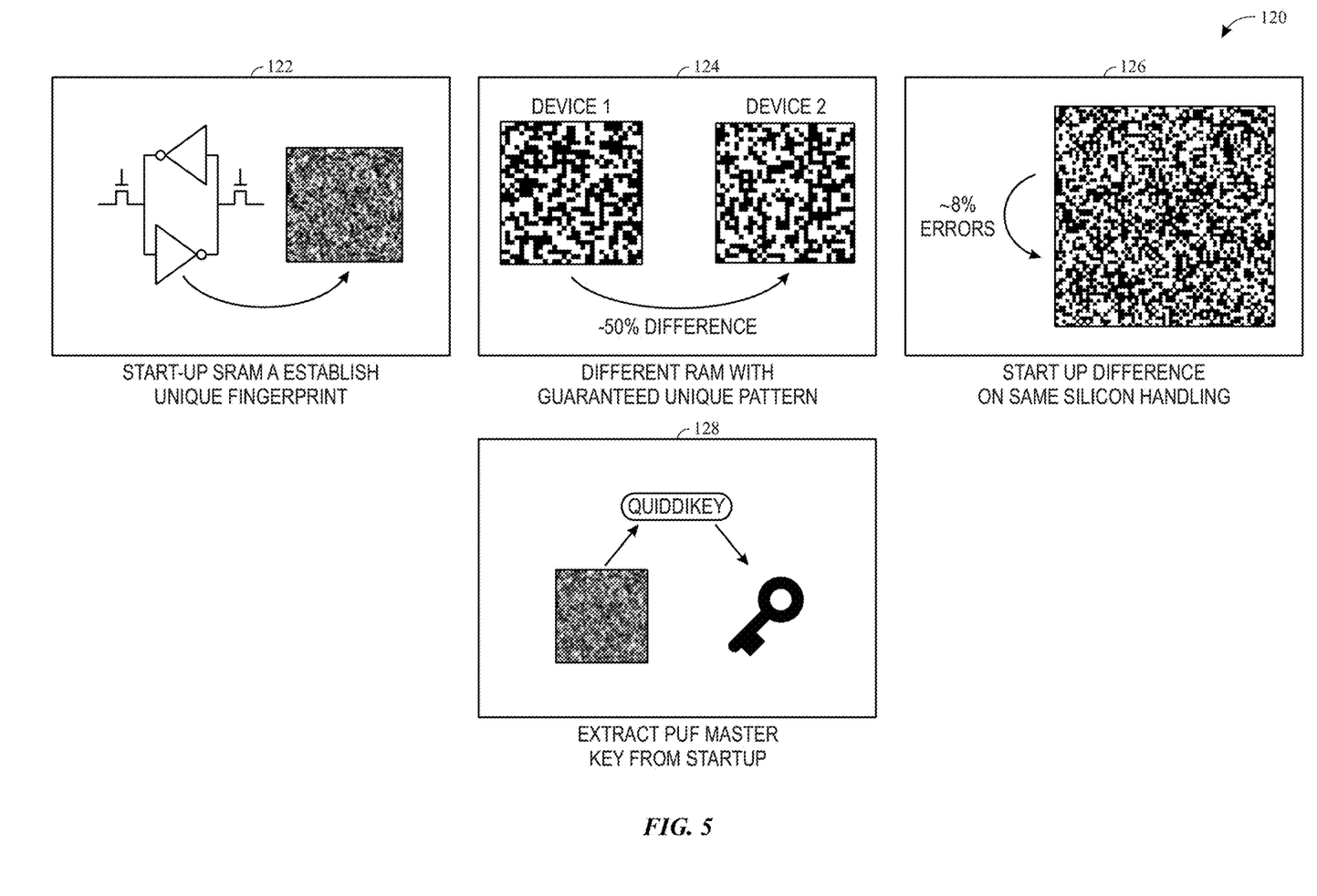
FIG. 5 is a block diagram, illustrating derivation 120 of a key from a physical unclonable function (PUF) of a programmable device, in accordance with an embodiment.

FIG. 5 is a block diagram, illustrating derivation of a key from a physical unclonable function (PUF) of a programmable device, in accordance with an embodiment. In FIG. 5, a random access memory (RAM) PUF is illustrated. In frame 122, during start-up of the RAM, a unique fingerprint of the cells of the RAM is established. Indeed, because RAM is not typically reset, the cells of the RAM for separate devices may provide a unique fingerprint of cell values, as illustrated by the cell value comparison depicted in frame 124. Because the unique fingerprints are generated based upon unique manufacturing characteristics for each of the ICs, each time the PUF-based fingerprint is generated, it may be significantly similar to other fingerprint generations. However, there may be some slight variation, due to noise, etc., as depicted in frame 126. A PUF-based key may be generated extracted from the generated fingerprint, as depicted in frame 128. The key extraction may implement error correction to account for the slight variations (e.g., illustrated in frame 126), to ensure that the same key is extracted, even when slight variations are present in a subsequently generated fingerprint. This may be accomplished using the help data of the enrollment process, as discussed in more detail herein.

In some embodiments, there may be an enrollment phase and an activation phase for PUF-based key generation. In the enrollment phase, a golden or master image of the PUF is derived, which is used for generation of PUF root key. In this phase, the help data and/or other options (e.g., eFuse options) may be stored, which may be used by the ICs 10 to regenerate the same PUF-based keys during a subsequent activation phase.

Figure 6:
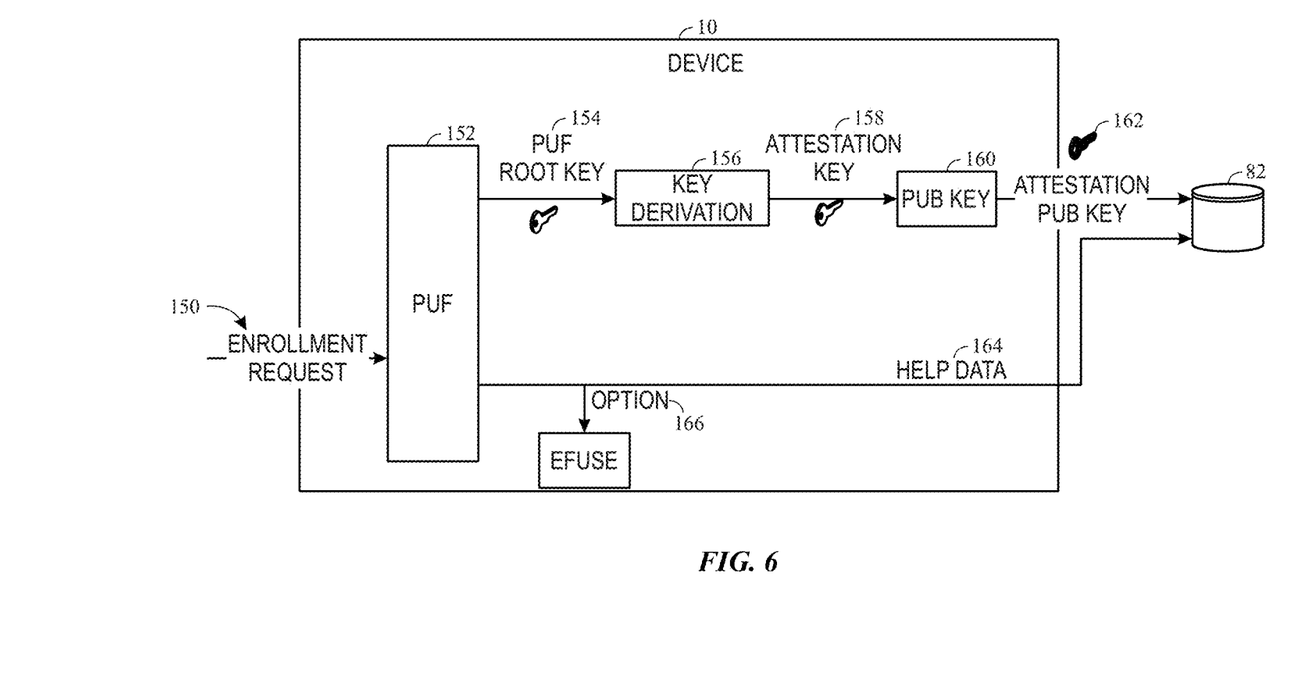
FIG. 6 is a block diagram, illustrating PUF-based enrollment, in accordance with an embodiment.

FIG. 6 is a block diagram, illustrating PUF-based enrollment, in accordance with an embodiment. Upon receiving an enrollment request 150, the programmable device (e.g., IC 10) may begin a process to generate a public key. As mentioned above, the IC 10 may include a physical unclonable function (PUF) 150. Based upon a golden/master image of the PUF 150, a PUF root key 154 (e.g., a red key) may be derived.

A key derivation function 156 may derive one or more cryptographically strong secret keys from the initial golden/master image and/or PUF root key 154. Accordingly, using the key derivation function 156, a private attestation key 158 (e.g., a red key) may be derived. As will be discussed in more detail below, the private attestation key 158 may be used as the signing key for transmission of the black key to the IC 10.

A public key derivation function 160 may be used to derive an attestation public key 162 (e.g., a black key) that may be exported to the developer PUF database 82. The attestation public key 162 may be used to verify the IC 10's identity, as will be discussed in more detail below.

Additionally, help data 164 and/or eFuse options 166 may be generated and provided, which may be retrieved and applied for subsequent activations. As mentioned above, when the help data 164 and/or eFuse options 166 are applied, the IC 10 will provide the same image as the golden/master image of the PUF 152.

Figure 7A:
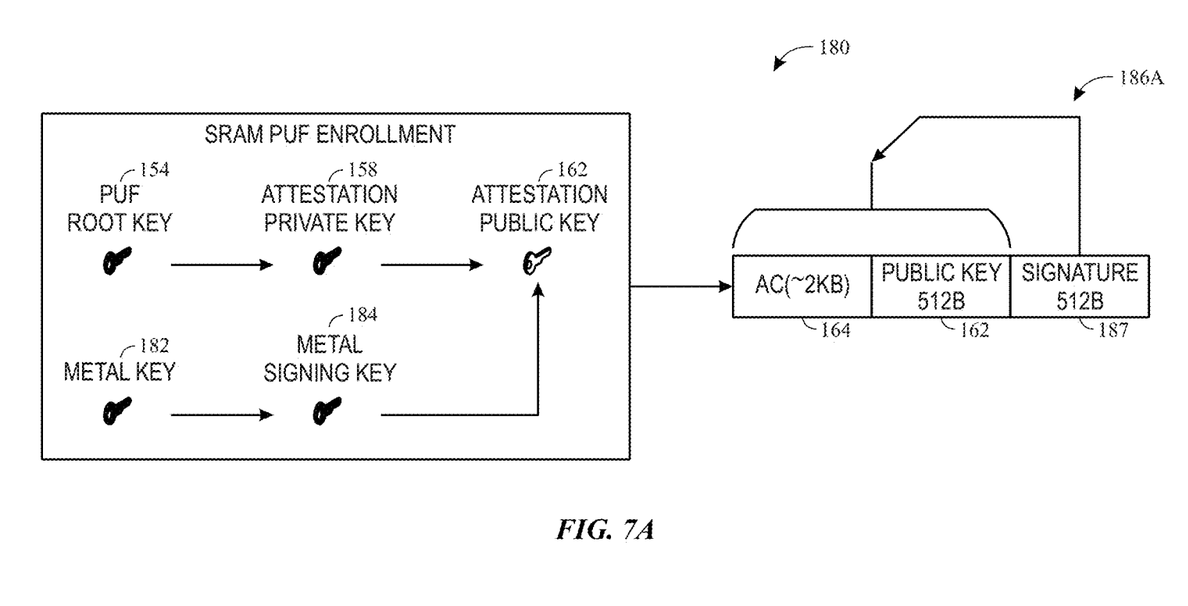
FIG. 7A is a block diagram, illustrating SRAM PUF-based enrollment, in accordance with an embodiment.
Figure 7B:
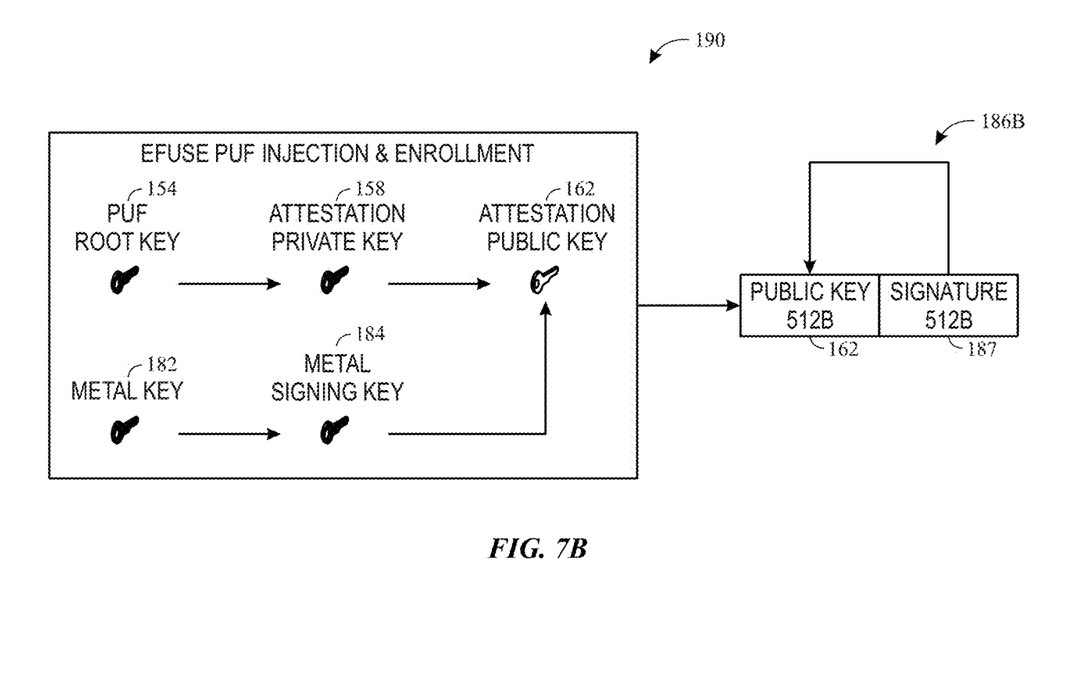
FIG. 7B is a block diagram, illustrating eFuse PUF-based enrollment, in accordance with an embodiment.

Many PUF variations may be used to derive the keys of the enrollment process. As previously mentioned, in some embodiments, RAM and/or eFuse PUFs may be used. FIG. 7A is a block diagram, illustrating SRAM PUF-based enrollment 180, in accordance with an embodiment. FIG. 7B is a block diagram, illustrating eFuse PUF-based enrollment 190, in accordance with an embodiment. These embodiments will be discussed together.

In either case (e.g., RAM or eFuse-based enrollment), an attestation private key 158 may be derived from the PUF root key 154. Further, an attestation public key 162 corresponding to the attestation private key 158 may be derived.

To ensure that the developer is providing the attestation public key 162, a metal signing key 182 may be used to derive a metal signing key 184. The metal signing key 184 may be used to sign the attestation public key 162, verifying the source of the attestation public key 162.

The main difference between the SRAM PUF-based enrollment 180 and the eFuse PUF-based enrollment 190 is that SRAM PUFs may use the help data 164 (e.g., activation code) to ensure that the same key is generated in both the enrollment and activation phases, while eFuse PUFs may merely rely on a one-time programming of eFuses on the IC 10. Accordingly, the help data 164 may be bundled with the public key data packet 186A for the SRAM PUF-based enrollment 180, while no help data 164 is bundled with the eFuse-PUF-based enrollment 190.

As mentioned above, the metal signing key 184 may be used to sign the public key data packets 186A and 186B. Accordingly, as illustrated by the public key data packet 186A in FIG. 7A, the attestation public key 162 and the help data 164 (e.g., activation code) may be signed by the signature 187. Further, as illustrated by the public key data packet 186B in FIG. 7B, the attestation public key 162 may be signed by the signature 187. The public key data packets 186A and/or 186B may be exported from the IC 10 (e.g., to the developer PUF database 82).

Figure 8:
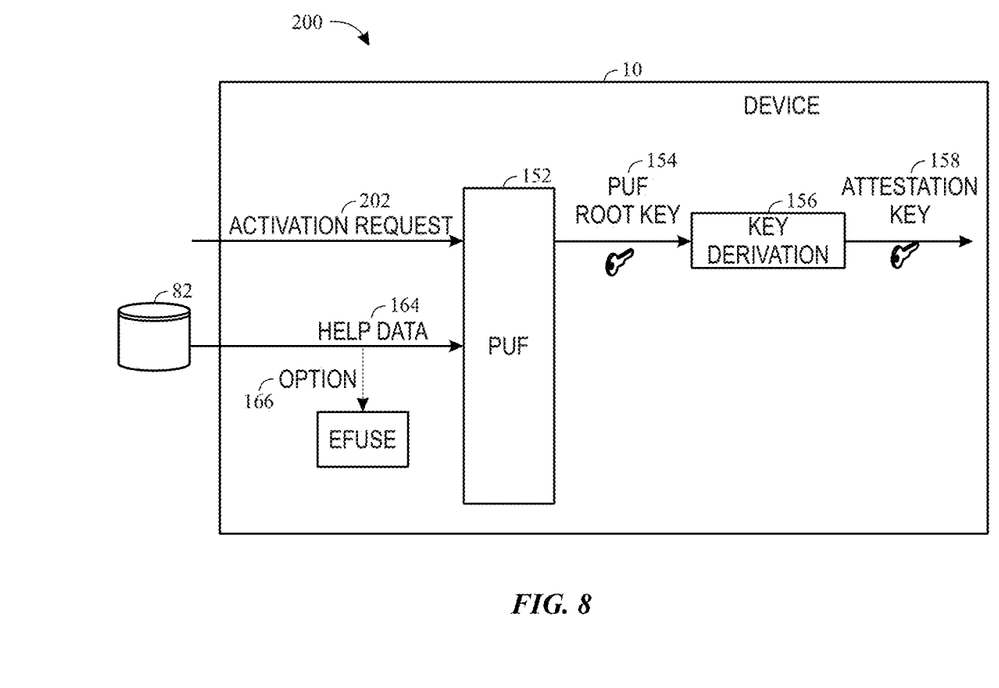
FIG. 8 is a block diagram, illustrating an activation process, in accordance with an embodiment.

FIG. 8 is a block diagram, illustrating an activation process 200, in accordance with an embodiment. The activation process may be implemented, for example, upon one or more power on processes of the IC 10. An activation request 202 is received and the help data 164 and/or option 166 previously stored in the developer-hosted PUF database 82 during the enrollment process is retrieved. Using the help data 164 and/or option 166, along with the PUF 152, the PUF root key 154 generated during the enrollment process may be re-generated. Once the PUF root key 154 is re-generated, the key derivation function 156 may re-generate the attestation key 158, which may be used in provisioning the black key for the IC 10, as will be discussed in more detail below.

Figure 9:
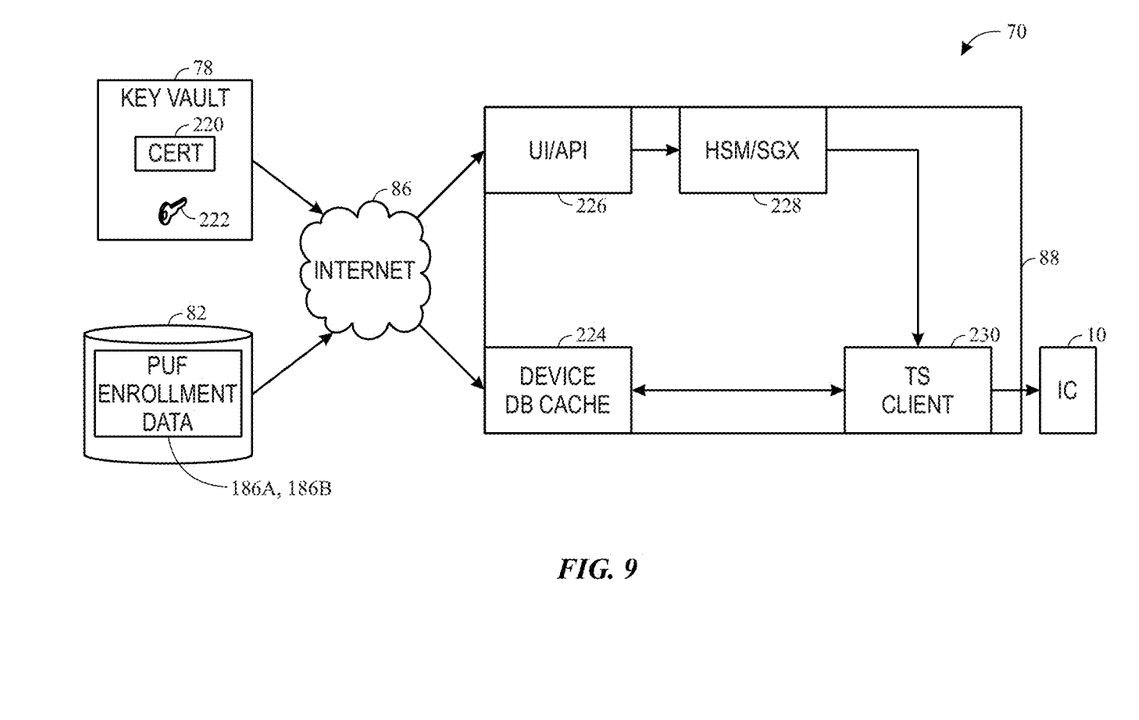
FIG. 9 is a block diagram, illustrating a system that uses a manufacturer appliance for securely provisioning secret keys to programmable devices, in accordance with an embodiment.

FIG. 9 is a block diagram, illustrating a view of the system 70 that provides additional details of the manufacturer appliance 88 for securely provisioning secret keys to programmable devices, in accordance with an embodiment. As previously mentioned, the PUF enrollment data (e.g., the public key data packets 186A and/or 186B of FIGS. 7A and 7B, respectively), may be exported to the developer-hosted PUF database 82. The PUF database 82 may be periodically (e.g., weekly, monthly, etc.) be downloaded to the device database cache.

Security keys may be received via a user interface and/or application programming interface (API) component 226. The security keys may be maintained in a secure enclave of the appliance 88, such as hardware security module (HSM) and/or Intel® Software Guard Extensions (SGX).

Additionally, the product owner 76 may host the customer key vault 78. The customer key vault 78 may hold the secret keys 222 (e.g., black keys) for provisioning on the ICs 10, via the appliance 88.

In some embodiments, the product owner 76, via the customer key vault 78, may issue a certificate 220 to the appliance 88, indicating a secure state for the product owners' ICs 10. Additionally, an indication of a particular number of ICs to provision may be indicated. When the particular number of ICs is provisioned, provisioning of additional black keys by the appliance 88 may be disabled. Using key information from the PUF database 82 and the key vault 78, the appliance 88 may provision secret keys 222 provided by the key vault 78, by establishing a secure connection between a transport stream (TS) client 230 of the appliance and the IC 10.

Figure 10:
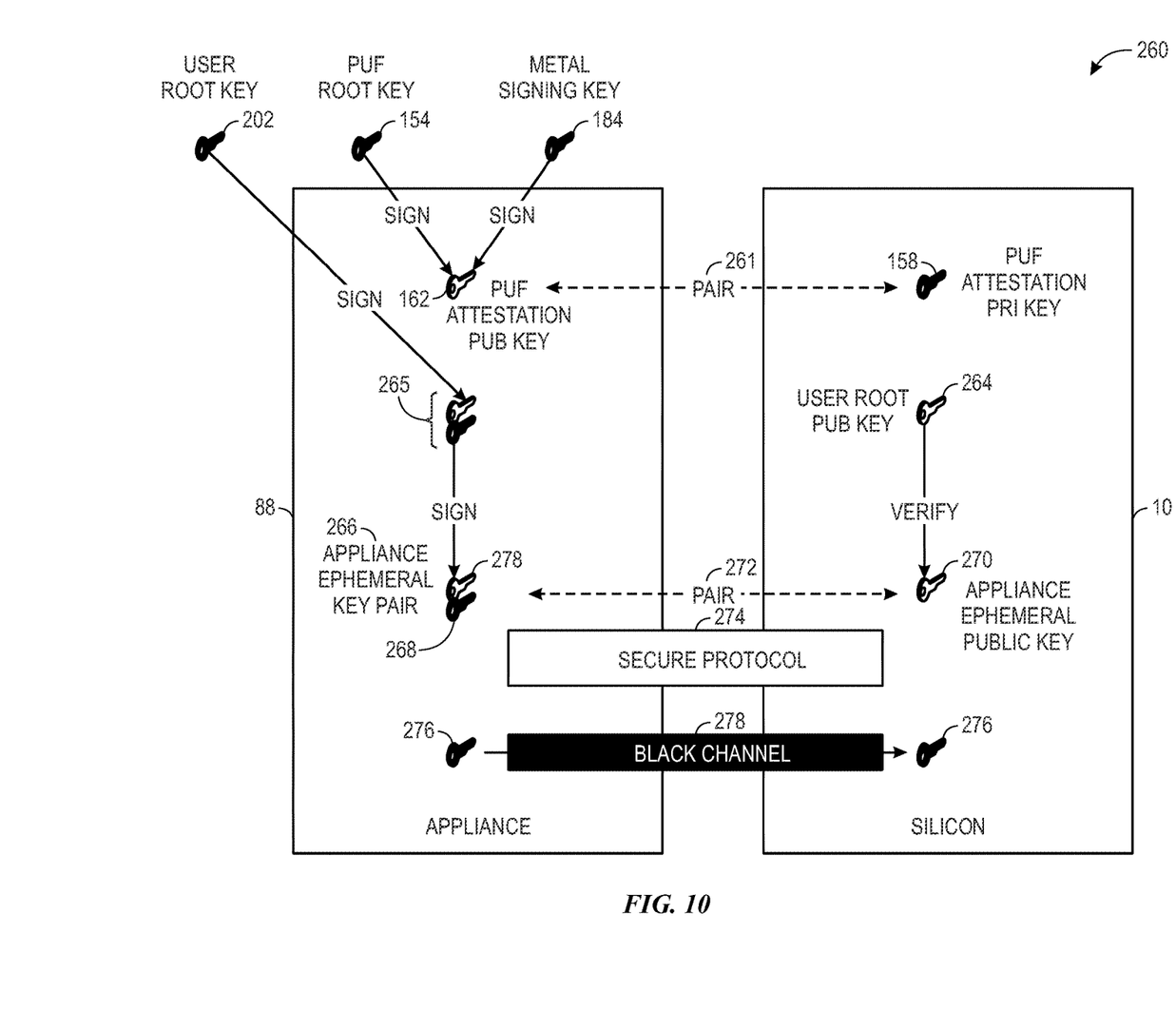
FIG. 10 is block diagram, illustrating a process for provisioning a secret key to a programmable device via a secure channel, in accordance with an embodiment.

FIG. 10 is block diagram, illustrating a process 260 for provisioning a secret key to a programmable device via a secure channel, in accordance with an embodiment. As previously discussed, the appliance 88 receives a set of PUF attestation public keys 162 for corresponding IC 10s (e.g., as identified based upon unique identifiers of the ICs 10) from the PUF database 82. As previously discussed with regard to FIGS. 7A and 7B, the PUF attestation public key 162 is derived based upon the PUF root key 154 and the metal signing key 184. The silicon (e.g., IC 10) may generate the PUF attestation private key 158, using help data stored in the device database cache 224, during an activation phase, as discussed with regard to FIG. 8. Accordingly, a pairing 261 may be established between the PUF attestation public key 162 of the appliance 88 and the PUF attestation private key 158 on the silicon (e.g., IC 10).

A private user root key 262 may be stored in the key vault 78 and a corresponding public user root public key 264 may be programmed on the IC 10. The appliance may generate appliance key pair 265 and derive an appliance ephemeral key pair 266 (e.g., an appliance ephemeral private key 268 and an appliance ephemeral public key 270), signed by the private user root key 262. The appliance ephemeral public key 270 may be provided to the IC 10. The appliance ephemeral public key 270 supplied to the IC 10 may be verified using the user root public key 264, based upon the signing chain of the user root key 262 by the appliance 88. Accordingly, a pairing 272 may be established between the appliance ephemeral private key 268 of the appliance 88 and the appliance ephemeral public key 270 on the silicon (e.g., IC 10).

Because the appliance 88 and the IC 10 each include a private key with a associated public key, a secure link may be established between the appliance 88 and the IC 10 (e.g., via a secure protocol 274). The secure protocol 274 establishes session keys 276, enabling secure transmission of data through a black channel 278. For example, the black keys (e.g., Advanced Encryption Standard (AES) keys) may be provisioned to the IC 10.

Figure 11:
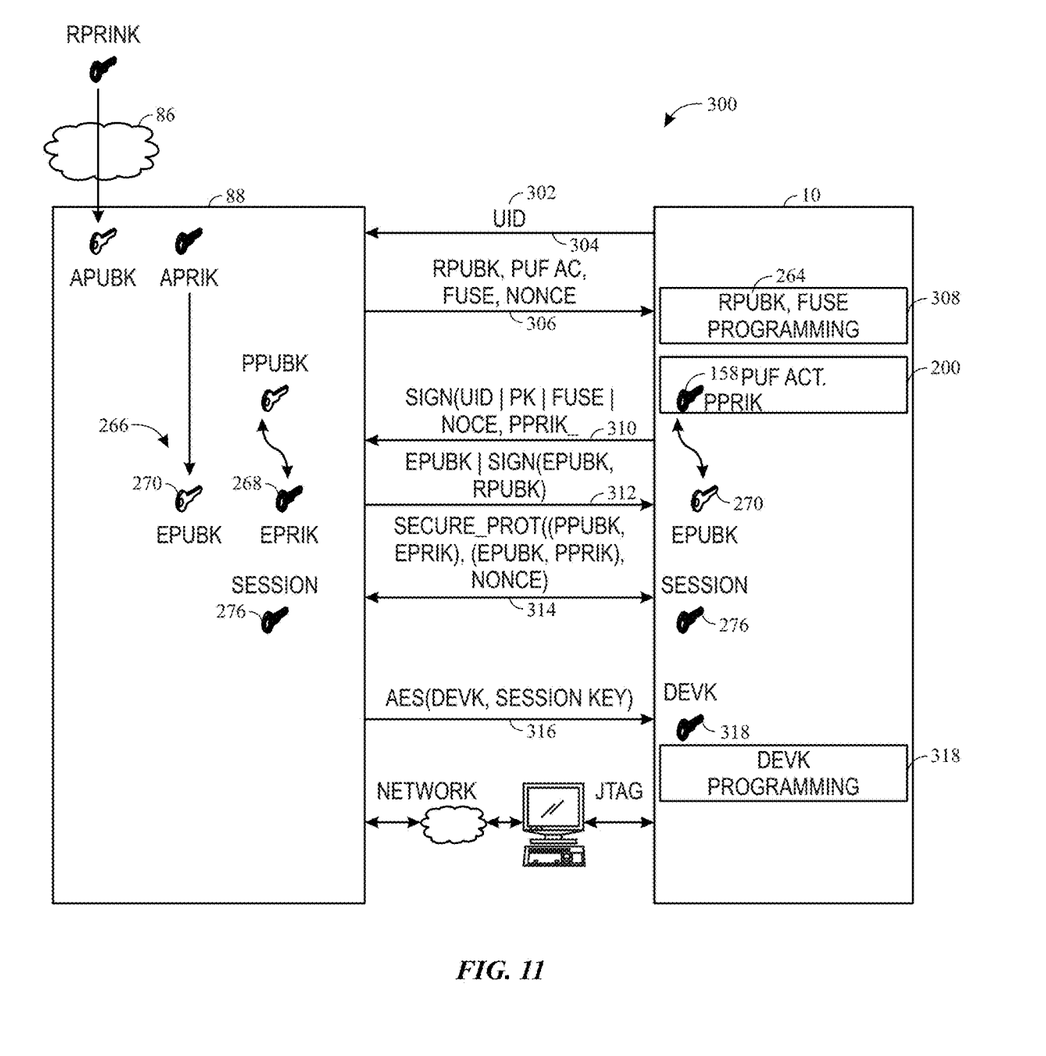
FIG. 11 is block diagram, illustrating detailed communications for provision of a secret key on a programmable device, in accordance with an embodiment.

FIG. 11 is block diagram, illustrating detailed communications 300 for provision of a secret key on a programmable device, in accordance with an embodiment. As previously discussed, the appliance 88 may download the PUF database 82 at periodic intervals. A unique identifier (UID) of a particular IC 10 may associate the PUF keys with the particular IC 10 in the PUF database 82. Accordingly, the appliance 88 may extract the unique identifier 302 from the IC 10, to identify the proper PUF data associated with the particular IC 10 to be programmed. This UID 302 extraction is illustrated by data provision 304.

Once the UID 302 is obtained, the appliance may determine the user root public key 264, and any PUF help data and/or eFuse settings. Additionally, a nonce (a one-use arbitrary number) may be determined by the appliance 88. This information is provided to the IC 10, as illustrated by data provision 306.

Once the PUF help data and/or eFuse settings are downloaded to the IC 10, the IC 10 may program the eFuse (block 308). Then the PUF activation process (e.g. process 200 of FIG. 8) is initiated, resulting in generation of the private PUF key 158. The public PUF key 162 is already in the appliance 88, as it was downloaded from the PUF database 82. Accordingly, a corresponding public and private key pair are established between the IC 10 and the appliance 88. Accordingly, the IC 10 may attest the communication, by signing with the generated private PUF key 158, as illustrated by data provision 310.

As mentioned above with regard to FIG. 10, the appliance 88 may generate an appliance ephemeral key pair 266. The ephemeral public key 270 is signed by the root public key 264 and is transferred to the IC 10, as illustrated by data provision 312. The IC 10 may then verify the ephemeral public key 270, using the root public key 264. The secure protocol 274 may be used to establish session key 276, as illustrated by data provision 314. Using the session key 276, a secure channel may be established for provision of the secret key (e.g., an AES key), as illustrated by data provision 316. This enables AES device key (or other) programming (block 318).

Once the ephemeral public key 270 is verified, a corresponding public and private key pair are established between the appliance 88 and the IC 10. Accordingly, the IC 10 includes a private key with a corresponding public key at the appliance 88 and the appliance 88 include a private key with a corresponding public key at the IC 10.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An appliance, configured to:
   receive a programmable secret key from a key vault hosted by an owner of an integrated circuit (IC); and
   program the programmable secret key on the IC;
   wherein the appliance comprises:
   a database cache, configured to store physical unclonable function (PUF) enrollment data for the IC, wherein the PUF enrollment data is provided to the appliance by a manufacturer of the IC;

a secure enclave, configured to, upon receiving the programmable secret key, store the programmable secret key for the IC, restricting access by the manufacturer of the IC to the programmable secret key; and a transport stream (TS) client, configured to:
establish a secure communication channel with the IC using one or more encryption keys derived at least based in part upon the PUF enrollment data; and
program the programmable secret key from the key vault on the IC, via the secure communication channel.

2. The appliance of claim 1, wherein the key vault provides an indication of a number of ICs that may be programmed, and wherein programming of the programmable secret key on the IC is disabled if the number of ICs is exceeded.

3. The appliance of claim 1, wherein the appliance is configured to receive the PUF enrollment data from a remote PUF database.

4. The appliance of claim 3, wherein the remote PUF database is hosted by a developer of the IC.

5. The appliance of claim 3, wherein the appliance is configured to receive the PUF enrollment data from the remote PUF database at periodic intervals.

6. The appliance of claim 1, wherein the database cache comprises a superset of PUF enrollment data for a plurality of ICs, and the appliance is configured to:
extract a unique identifier (UID) from the IC to identify the IC; and
select the PUF enrollment data from the superset of PUF enrollment data, based upon the UID.

7. The appliance of claim 1, wherein the appliance is configured to:
extract a PUF public key from the PUF enrollment data;
generate an ephemeral key set, comprising an ephemeral public key and an ephemeral private key;
sign the ephemeral public key with a root public key;
provide the signed ephemeral public key to the IC; and
establish the secure channel via a security protocol, using the ephemeral private key on the appliance, the PUF public key on the appliance, a PUF private key on the IC, and the signed ephemeral public key.

8. The appliance of claim 1, wherein the PUF enrollment data is sourced from a random access memory (RAM) PUF.

9. The appliance of claim 1, wherein the PUF enrollment data is sourced from an eFuse PUF.

10. The appliance of claim 1, wherein the appliance is configured to provision the secret key using Joint Test Action Group (JTAG) programming of the IC.

11. The appliance of claim 1, wherein the IC is a field programmable gate array (FPGA).

12. An integrated circuit (IC), comprising:
a physical unclonable function (PUF);
wherein the IC is configured to:
provide a unique identifier (UID) to an appliance;
receive, from the appliance, physical unclonable function (PUF) enrollment data associated with the UID, wherein the PUF enrollment data is provided by a manufacturer of the IC;
derive a private PUF key based upon the PUF and the PUF enrollment data;
receive, from the appliance, an IC ephemeral public key from the appliance;
establish a secure communication session with the appliance using the private PUF key of the IC, the IC ephemeral public key, a public PUF key of the appliance, and an ephemeral private key of the appliance; and
receive programmable secret data from a key vault hosted by an owner of the IC, via the appliance over the secure communication session, wherein the appliance restricts access by the manufacturer of the IC to the programmable secret data.

13. The integrated circuit of claim 12, wherein the programmable secret data comprises an Advanced Encryption Standard (AES) key.

14. The integrated circuit of claim 12, wherein the AES key is sourced from a key vault hosted by a product owner.

15. The integrated circuit of claim 12, wherein the integrated circuit is subjected to a PUF enrollment process wherein:
a unique fingerprint is obtained via the PUF;
the public PUF key and the private PUF key are derived based upon the unique fingerprint; and
the PUF enrollment data is generated and stored in a PUF database for subsequent retrieval by the appliance.

16. The integrated circuit of claim 15, wherein in the PUF enrollment data comprises help data, and the integrated circuit is configured to derive the private PUF key by:
applying the help data to re-obtained the unique fingerprint; and
generate the private PUF key based upon the re-obtained unique fingerprint.

17. A computer-implemented method, comprising:
receiving, at an appliance, from a physical unclonable function (PUF) database hosted by an integrated circuit developer, PUF enrollment data, comprising a public PUF key derived from a PUF of an integrated circuit;
receiving, at the appliance, from a key vault hosted by a product owner of the integrated circuit, a certificate comprising programmable secret data to program on the integrated circuit, wherein access to the certificate is limited to the product owner of the integrated circuit and access to the certificate by a manufacturer of the IC is restricted;
generating an ephemeral key set, comprising an ephemeral public key and an ephemeral private key;
signing the ephemeral public key with a root public key;
providing the signed ephemeral public key to the IC; and
establishing a secure communication channel via a security protocol, using the ephemeral private key of the appliance, the PUF public key of the appliance, a PUF private key of the integrated circuit, and the signed ephemeral public key of the integrated circuit.

18. The computer-implemented method of claim 17, comprising:
programming, from the appliance, an Advanced Encryption Standard (AES) key to the integrated circuit via the secure channel.

19. The computer-implemented method of claim 17, comprising:
providing help data to the integrated circuit, wherein the help data is configured to enable the integrated circuit to re-generate a previously identified unique fingerprint that is based upon a PUF of the integrated circuit, such that a private PUF key previously derived from the PUF may be re-derived by the integrated circuit.

\* \* \* \* \*